United States Patent
Seroussi (10) Patent No.: US 7,254,250 B2
(45) Date of Patent: Aug. 7, 2007

(54) WATERMARK EMBEDDING AND EXTRACTION METHOD AND APPARATUS IN COMPRESSED STREAMS

(75) Inventor: Gadiel Seroussi, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 921 days.

(21) Appl. No.: 10/632,710

(22) Filed: Jul. 31, 2003

(65) Prior Publication Data

US 2005/0025332 A1    Feb. 3, 2005

(51) Int. Cl.
*G06K 9/00* (2006.01)
(52) U.S. Cl. ........................ 382/100; 382/244
(58) Field of Classification Search ............. 382/100, 382/232–233, 244–246; 358/3.28; 713/176, 713/179; 380/210, 287, 252, 54, 51, 201; 341/59, 65, 67, 107, 51, 87, 106
See application file for complete search history.

(56) References Cited

U.S. PATENT DOCUMENTS 6,950,519 B2 * 9/2005 Rhoads ..................... 382/100
7,187,780 B2 * 3/2007 Tian et al. ................ 382/100

* cited by examiner

*Primary Examiner*—Ishrat Sherali (57) ABSTRACT

A method and apparatus embeds and extracts a watermark bit-sequence in a data stream of symbols compressed using dictionary-based compression scheme with variable length indices. The embedding transmits an index value from a set of m-bit index values used to compress symbols in the data stream, identifies divisions and unused bits in the set of m-bit index values, determines a watermark bit value as either a zero-bit value or a one-bit value, transmits the index value in a one-bit watermark value range when the watermark bit value is determined to be a one-bit value and transmits the index value in a zero-bit watermark value range when the watermark bit value is determined to be a zero-bit value. Extracting the watermark reverses these operations and classifies the indices as being in either the zero-bit watermark value range or the one-bit watermark value range until the watermark is recreated.

52 Claims, 6 Drawing Sheets

Where:

$\Delta_t = 2^m - 1 - C_t = 2^9 - 1 - 272 = 239$ $W_t = 2*C_t + 2 - 2^m = 2*272 + 2 - 2^9 = 34$ $i_t = 200$ $C_t = 272$

WATERMARK EMBEDDING AND EXTRACTION METHOD AND APPARATUS IN COMPRESSED STREAMS

BACKGROUND OF THE INVENTION

The present invention relates to data compression and watermarking.

In computing, a watermark is a bit-sequence that relates or is associated with other digital content. Unlike printed watermarks consisting of specially printed images or embossed papers, digital watermarks may also correspond to general number sequences, checksums or any other type of digitally transmitted data. Resilient digital watermarks can be used to identify the owner of certain content. These watermarks continue to identify a particular owner despite attempts by a third party to remove or alter the content without authorization. In contrast, fragile watermarks become unreadable or corrupt when digital content and the underlying watermark are altered. These fragile watermarks ensure the authenticity of certain documents and prevent data tampering from going unnoticed. No doubt, many other uses of digital watermarks exist and will be created in the future.

In most cases, the watermark is transmitted along with an input stream of digital data. If the input stream is not compressed, the watermark can be added to the digital data input stream increasing the overall amount of data being transmitted. Often however, it is desirable to compress the digital data stream thereby increasing the effective network bandwidth and decreasing storage requirements. One solution is to compress the input stream using a compression routine and then add the watermark bit sequence.

Adding a watermark to compressed digital data is not particularly difficult using lossy compression techniques. These lossy compression techniques selectively eliminate certain bits and replace them with the watermark values, or otherwise alter the encoded data to introduce the watermark information. Data loss in the original data stream is not only caused by the lossy compression/decompression operation but exacerbated by the addition of the watermark. In some cases, the loss introduced by the addition of a watermark is acceptable.

Unfortunately, adding a watermark and loss to an input data stream compressed losslessly defeats the purpose of lossless compression. Popular lossless compression methods such as the Lempel-Ziv (LZ) schemes do not provide space for watermark insertion. Resolving this problem is even more challenging if an inserted watermark cannot reduce compression performance and must also preserve the size of the compressed stream. Even if the watermarks could be introduced without introducing loss or compression performance deterioration, it would be difficult to do so and ensure that the enhanced decompressors be backward compatible with existing coders and compressed streams. Lack of backward compatibility stands as an impediment to enhancing lossless compression operations to accept watermarks.

BRIEF DESCRIPTION OF THE DRAWINGS

Like reference numbers and designations in the various drawings indicate like elements.

SUMMARY OF THE INVENTION

One aspect of the present invention features a method of embedding a watermark bit-sequence in a data stream of symbols compressed using a dictionary-based compression scheme with variable length indices. The watermark embedding includes receiving a request to transmit an index value from a set of m-bit index values used to compress one or more symbols in the data stream, identifying divisions in the set of m-bit index values including a non-watermark value range, a zero-bit watermark value range and a one-bit watermark value range, determining a watermark bit value corresponding to the watermark bit sequence as either a zero-bit value or a one-bit value, transmitting the index value in the one-bit watermark value range when the watermark bit value is determined to be a one-bit value and transmitting the index value in the zero-bit watermark value range when the watermark bit value is determined to be a zero-bit value.

Another aspect of the present invention describes a method of extracting a watermark bit-sequence from a data stream of symbols compressed using a dictionary-based compression scheme with variable length indices. The watermark extraction includes identifying the divisions for a non-watermark value range, a zero-bit watermark value range and a one-bit watermark value range within a set of m-bit index values, receiving an input index value potentially having an embedded watermark value, classifying the input index value as a member of one of the divisions within the set of m-bit index values, setting a next bit of the watermark bit-sequence to a zero value when the input index value is in the zero-bit watermark value range and setting a next bit of the watermark bit-sequence to a one value when the input index value is in the one-bit watermark value range.

DETAILED DESCRIPTION

Aspects of the present invention are advantageous in at least one or more of the following ways. Watermarks can be embedded without introducing loss in a stream of symbols compressed using a dictionary. This is particular useful as an enhancement to dictionary-based lossless compression like the Lempel-Ziv 78 [Reference to LZ78, LZW] (LZ78) family of lossless compression schemes. Embedding watermarks in accordance with the present invention complements the LZ lossless compression by adding the embedded watermark while maintaining the lossless compression, preserving compressed stream size and backward compatibility with conventional compressed streams. Instead of requiring more codespace, aspects of the present invention take advantage existing inefficiencies in compression resulting in unused codespace.

Implementations of the present invention are also advantageous as they remain backward compatible with existing dictionary based compression techniques. Conventional decoders/decompression methods can process compressed data having an embedded watermark of the present invention without modification. The watermark is overlooked by these existing decoders and the data is decompressed as normal. By enhancing these conventional decoders/decompression methods with a plug-in or additional code in accordance with the present invention they can also extract the embedded watermark and then proceed to decompress data without consequence. This approach makes embedding watermarks in accordance with the present invention an attractive commercial solution as it can be implemented in a cost effective manner with little or no impact on existing compression solutions.

In application, watermarks can be embedded in accordance with the present invention in many different data stream and content types with significant advantages and few technical challenges. Systems for authentication can be devised using a fragile watermark to detect whether a compressed data stream has been altered subsequent to the compression. These and other watermark uses are contemplated to manage content as it becomes disentangled from more tangible mediums (i.e., CD-ROM, DVD and magnetic storage) and is instead transmitted fluidly over the Internet and other networks.

Figure 1:
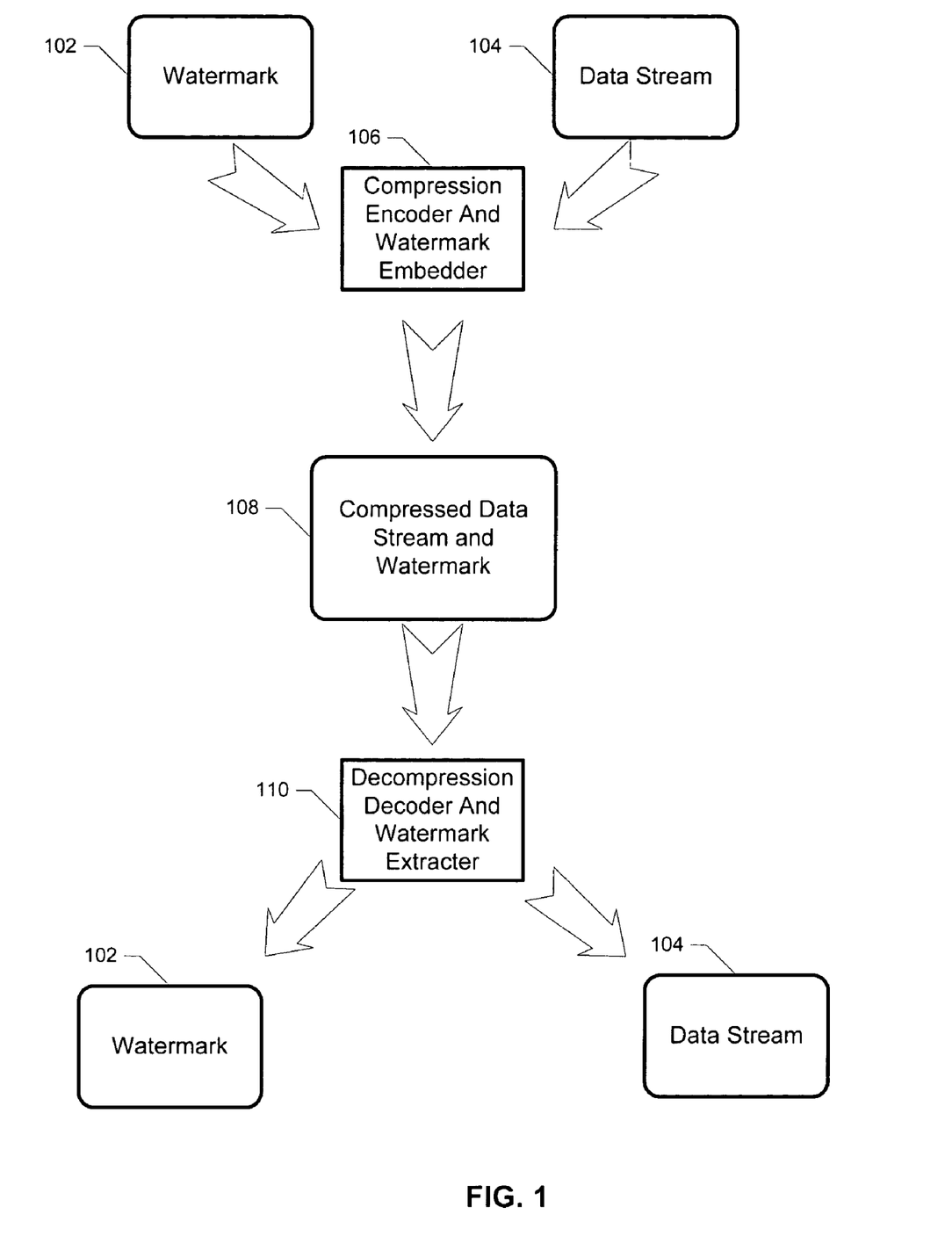
FIG. 1 is a block diagram overview of a system for embedding a watermark in accordance with one implementation of the present invention.

FIG. 1 is a block diagram overview of a system for embedding a watermark in accordance with one implementation of the present invention. System 100 includes a watermark 102 having a corresponding bit-sequence, a data stream 104 also having a bit-sequence, a compression encoder and watermark embedder 106 (hereinafter compression encoder 106), a compressed data stream and watermark 108 and a decompression decoder and watermark extractor 110 (hereinafter decompression decoder 110).

Watermark 102 is a bit-sequence containing additional information to be sent along with data stream 104. This bit-sequence in watermark 102 is not limited to carrying visual information or pictures but instead includes any information susceptible to digital encoding. In general, the watermark can be any type of digital data and is not limited to a specific data format or type of content. For example, watermark 102 can be a numeric sequence used for coding, a sequence of check digits for the input data, audio information, video-streaming data, digital images, metadata or any other information to be used in conjunction with the data stream 104.

Data stream 104 represents a bit-sequence being compressed in real-time. Once again, the bit-sequence in data stream 104 includes any information susceptible to digital encoding including, but not limited to, those examples previously described. As data stream 104 is compressed using compression encoder 106, an indexed dictionary of strings is created using variable length indices in accordance with LZ compression and its variants. The indexed dictionary of strings grows in number of entries as the input data is processed. If an initial m bits are used to encode dictionary indices, up to $2^m$ entries can be represented. When the number of entries reaches this threshold, wider m+1 bit codewords are required to accommodate the additional indices and larger dictionary; as the compression continues the codewords continue to grow in width until reaching $L_{max}$—the maximum codeword bit-width. Different compression methods accommodate additional index values in the dictionary once the $L_{max}$ bit length is reached by resetting the dictionary, deleting certain symbols or other recovery methodologies.

Meanwhile, during compression, the set of indices assigned to entries in the dictionary generally does not exhaust the whole range of m-bit wide codewords (m being the current codeword width). For example, a dictionary containing 272 entries might require 9-bit indices, but only a portion of the 512 9-bit binary combinations would correspond to valid entries. Implementations of the present invention opportunistically insert watermark 102 in these unused codeword portions bitwise in accordance with the corresponding bit-sequence.

Compressed data stream and watermark 108 contains a compressed version of data stream 104 further including watermark 102 embedded in accordance with the present invention. In one implementation, the data stream is compressed losslessly using the LZ family of compression and their variants; watermark 102 is also embedded losslessly as it uses unused codespace. Storage devices (i.e., CD-ROM, DVD) and networks can be used to transmit compressed data stream and watermark 108 as required by the particular application or need. As previously described, the embedded watermark can be a fragile watermark to readily detect if the compressed data stream has been altered. Many other applications of the present invention are also contemplated in the area of content storage and/or transport.

Decompression decoder 110 implemented in accordance with the present invention both extracts embedded watermark 102 and decompresses data stream 104. The decompressed data stream is identical to that produced by a non-enhanced decompressor when fed with a non-watermarked compressed stream. On the other hand, the enhanced decompressor is backward compatible with conventional non-watermarked compressed stream. When presented with such a stream, the enhanced decompressor "extracts" an all-zero watermark.

Figure 2:
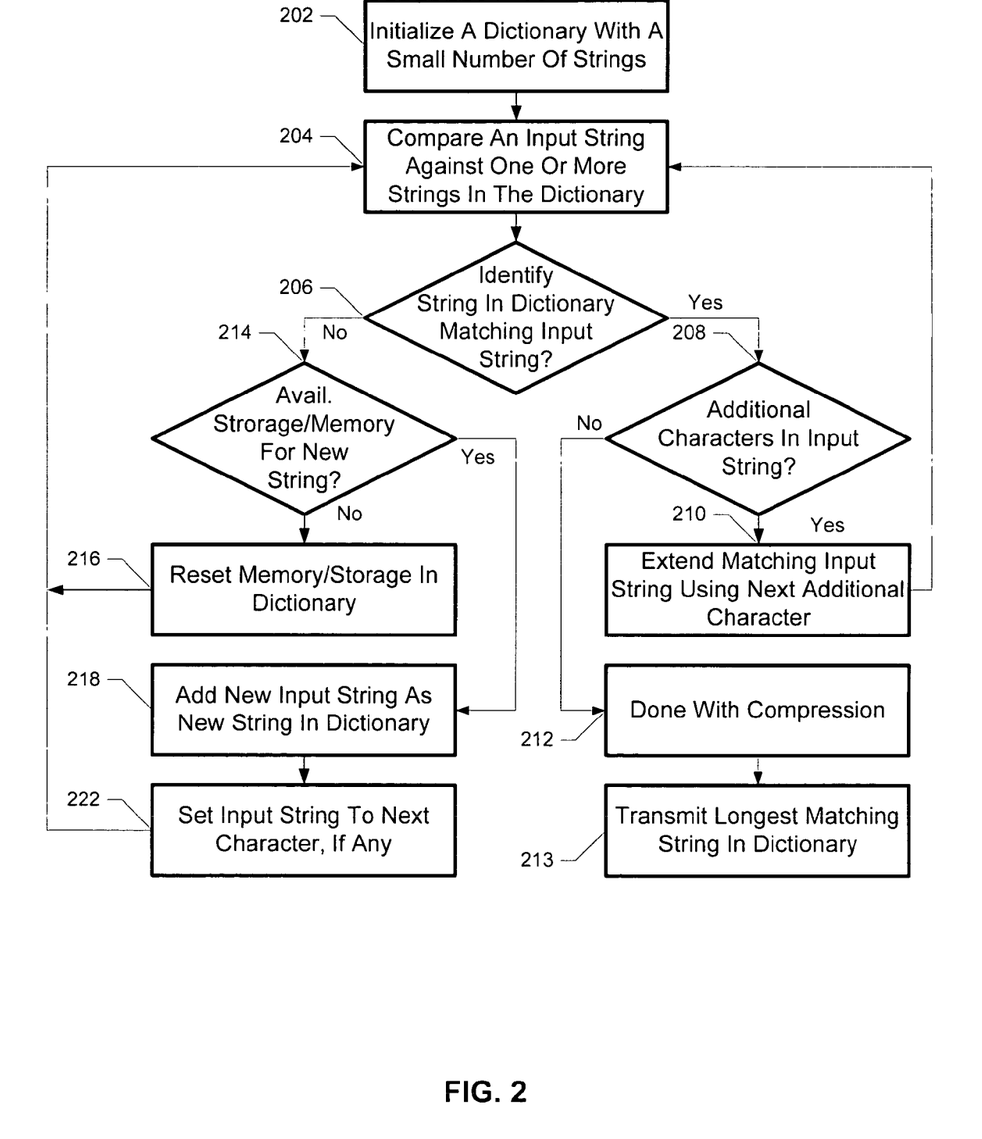
FIG. 2 is a flowchart diagram providing compression and watermark embedding operations in accordance with one implementation of the present invention.

FIG. 2 is a flowchart diagram providing compression and watermark embedding operations 200 in accordance with one implementation of the present invention. The compression scheme implemented follows the LZW variant of the LZ78 dictionary-based scheme. Initially, a dictionary is initialized with a small number of symbols and corresponding index values (202). For example, an m-bit dictionary may be initialized with the sequence of single-letter strings "a", "b", "c" and "d" corresponding to indices "1", "2", "3" and "4", respectively.

An input string containing several symbols of an uncompressed data stream is compared against the strings in this indexed dictionary (204). A matching entry in the dictionary indicates the currently parsed input string was already in the dictionary and has a corresponding index value (206).

Additional characters available in the input string are used (208) to find the longest current string in the input stream that matches a dictionary entry. Accordingly, the compression operation does not necessarily use the first matching string but attempts to match the uncompressed data stream with longer strings. Instead, the matching input string is extended using the next additional character in the uncompressed input stream (210). Replacing more characters in the uncompressed data stream with the transmission of a single index value is advantageous as it takes up less storage and increases the degree of compression. If no more characters are in the input stream then the compression is essentially complete (212) and the last identified index matching a string in dictionary is transmitted (213).

Otherwise, the matching input string is extended until the compression is unable to find a matching entry in the dictionary (206). The unmatched string is added as a new entry to the dictionary if storage/memory is available to store it (214). If there is not sufficient storage/memory, the dictionary storage/memory is reset (216) in accordance with the particular compression scheme. Some variants of LZ compression selectively release entries in the dictionary while other variants will re-initialize the dictionary to a starting configuration.

Using the available storage/memory, the new uncompressed input string is added as a new entry and indexed in the dictionary (218). Depending on its location in the current range of indexes, this index might be modified to embed watermark information in accordance with implementations of the present invention. Details on embedding the watermark bits depending on the index classification are described in further detail later herein. The uncompressed input string is set to the next character, if any (222) and the compression operation continues.

Figure 3:
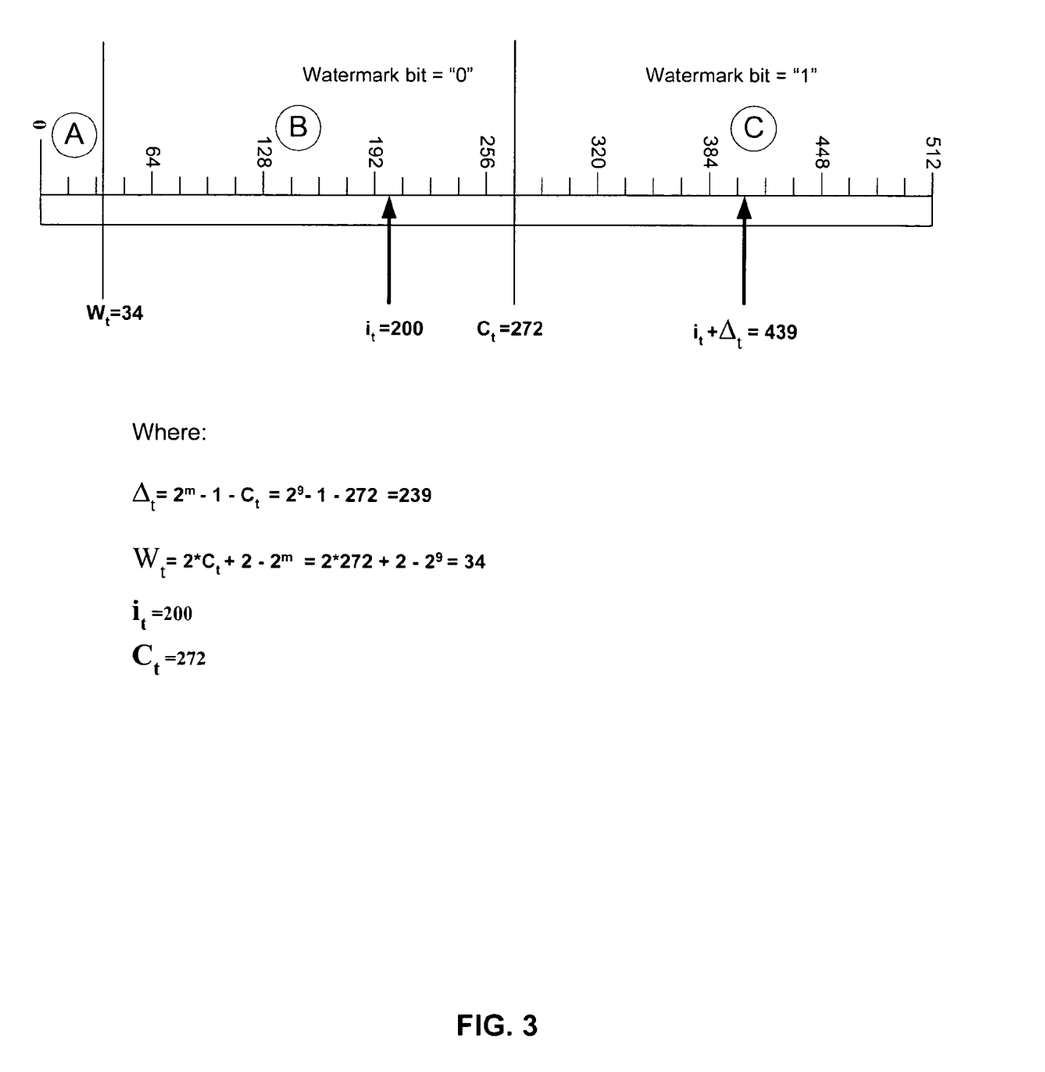
FIG. 3 is a schematic illustration for dividing a codespace to transmit both a compressed datastream and a watermark in accordance with one implementation of the present invention.

FIG. 3 is a schematic illustration for dividing a codespace to transmit both a compressed datastream and a watermark in accordance with one implementation of the present invention. The codespace in this example implementation is divided into three different regions: region A—a non-watermark value range, region B—a zero-bit watermark range and region C—a one-bit watermark range. An index ($i_t$) to be transmitted at time t from region A corresponds to a string in the input stream but does not include any watermark data. However, if the next index to be transmitted falls in region B then one of two events may occur: the index in region B is transmitted when the next watermark bit is a zero-bit value or an index in region C is transmitted if the next watermark bit is a one-bit value. The index in region C is selected by applying some function to the index in region B. In one implementation of the present invention, this function consists of adding a watermark delta value to the index ($i_t + \Delta_t$) falling in region B.

In a conventional LZ compression, the index values in region A and region B are valid but indices in region C, while recognizable during decompression, have not been assigned and normally would cause an error. Implementations of the present invention, however, take advantage of this fact for watermark embedding. Instead or causing an error, index entries in region C are allowed for the purpose of embedding the one-bit watermark values.

Entries in region B are in one-to-one correspondence with entries in region C to facilitate selecting an index corresponding to either a zero-bit or one-bit value in the watermark. Accordingly, the lower and upper boundaries of region B are selected to create this correspondence between the regions in a given codespace.

Boundaries for these regions setup in codespace 300 may be set arbitrarily to accommodate a particular watermark or class of watermarks or can be setup according to one or more formulas or relationships. This latter approach of using a formula is described below as one approach to implementing the present invention yet should not be interpreted to limit aspects of the present invention to only these described relationships. Instead, it is contemplated that implementations of the present invention encompasses many other alternate implementations using unused portions of the index code space to embed a watermark. For example, regions A, B, and C need not consist of contiguous indices, or obey the numerical order exemplified in FIG. 3.

In this example, a watermark threshold ($w_t$) marks the lower boundary of region B—the zero-bit watermark region. The watermark threshold $w_t$ provides a demarcation between watermark values and non-watermark values. In one implementation $w_t$ is determined as follows:

$$w_t = (2 \times c_t) + 2 - 2^m$$

where:

$w_t$ is a watermark threshold $c_t$: is the current largest index for an entry in dictionary where $2^{m-1} \leq c_t \leq (2^m - 1)$ $(2^m - 1)$: is the maximum value in an m-bit codeword and $m \leq L_{max}$ $i_t$: is the next index to be transmitted and $0 \leq i_t \leq c_t$ $L_{max}$: is the longest bit length codeword to be used in dictionary Further, a watermark delta value ($\Delta_t$) is selected to selectively shift a index value from region B—the zero-bit watermark region to region C—the one bit watermark region. This delta value implements the one-to-one correspondence between the entries in regions B and C. In accordance with one implementation, this watermark delta value $\Delta_t$, is determined as follows:

$$\Delta_t = 2^m - 1 - c_t$$

where:

$\Delta_t$: is the watermark delta value to select index in one-bit watermark area $(2^m - 1)$: is the maximum value in an m-bit codeword and $m \leq L_{max}$ $c_t$: is the current largest index entry in dictionary where $2^{m-1} \leq c_t \leq (2^m - 1)$ $L_{max}$: is the longest bit length codeword to be used in dictionary As one example, FIG. 3 provides values for these one or more variables described previously. In this example, an encoder operating at time t attempts to transmit an index value $i_t$ using a codeword of m-bits in width or, in this case, 9-bits wide. At time t, $c_t = 272$ is the largest index value assigned to a dictionary entry from the 512 possible indices. While a 9-bit codeword with values greater than 272 would be considered an error by the conventional compression/decompression operations, these values are used by implementations of the present invention for watermark embedding. Based on the value $c_t = 272$, the watermark threshold $w_t = 34$ is determined according to the formula above.

Here, $i_t = 200$ is the next index to be transmitted at time t. Because this value is greater than the watermark threshold $w_t = 34$, the encoder at this point in time has a choice to embed a bit-value from the watermark in the compressed data stream. Watermark delta value $\Delta_t$ is added to $i_t = 200$ and index $i_t + \Delta_t = 439$ is transmitted when the next watermark bit is a one-value. Conversely, no watermark delta value $\Delta_t$ is added to $i_t = 200$ and only $i_t = 200$ is transmitted when the next watermark bit is a zero-value. Of course, using a watermark delta value is just one convenient way to realize a one to one mapping between the index values in region B and the index values in region C. Consequently, it is contemplated that implementations of the present invention cover many other watermark embedding and mapping mechanisms in addition to the watermark delta value method described above.

Figure 4:
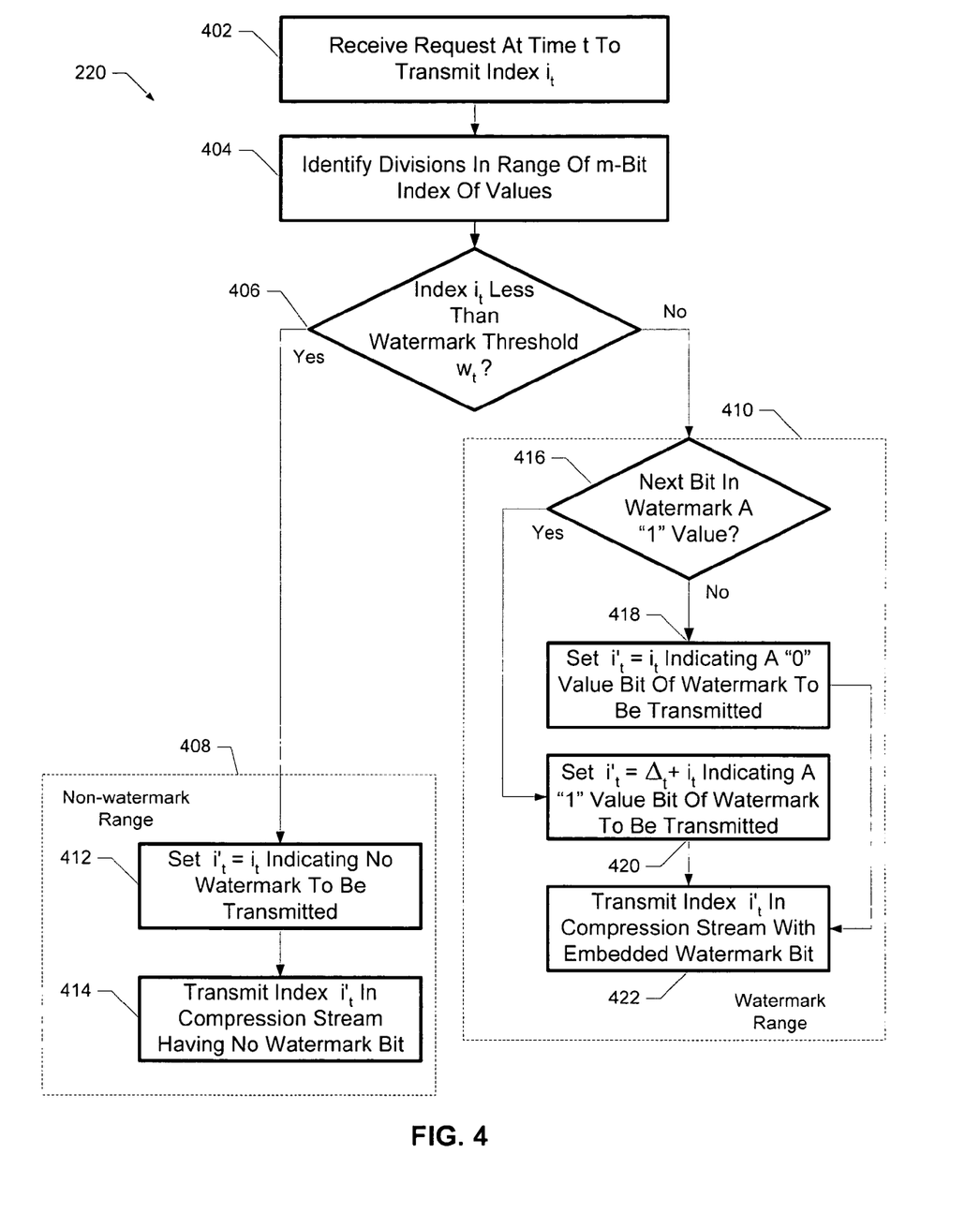
FIG. 4 is a flowchart diagram providing the operations for embedding a watermark in accordance with one implementation of the present invention.

FIG. 4 is a flowchart diagram providing the operations for embedding a watermark in accordance with one implementation of the present invention. Initially, an encoder receives a request at time t to transmit index $i_t$ (402). As described previously, the encoder identifies divisions in the range of m-bit index values (404) for compression and embedding a sequence of bits for a watermark. In one implementation, this identification includes calculation of a largest index entry $c_t$, a watermark threshold $w_t$ and a watermark delta value $\Delta_t$ as boundaries in the codespace as previously described. These boundaries divide the codespace into a non-watermark value range, a zero-bit watermark value range and a one-bit watermark value range.

If index $i_t$ is below the watermark threshold $w_t$, the index is in a non-watermark value range (406) and will not contain embedded watermark bits (408). Index $i_t$ values greater than the watermark threshold wt conversely can be used to carry embedded watermark bits (410) depending on the particular watermark. In the former condition, index $i_t$ does not carry watermark bits so $i_t'$ is set to $i_t$ (412) and the encoder transmits $i_t'$ in the compression stream without a watermark bit embedded (414).

In the latter condition, encoder checks to see if the next bit in the watermark bit-sequence is a "1" value (416) in which case the encoder sets $i_t'$ to $i_t + \Delta_t$ (420) in the one-bit watermark value range indicating a "1" value bit of the watermark is being transmitted. If the next bit in the watermark bit-sequence is a "0" value (416), $i_t'$ is set to $i_t$ in the zero-bit watermark value range indicating a "0" value bit of watermark is being transmitted (418). Once the encoder sets $i_t'$ to the proper value, the $i_t'$ value is transmitted into the compressed datastream along with the other codewords (422). If there is enough unused space in the compression stream, the watermark embedding operations continue until the watermark is completely embedded.

Figure 5:
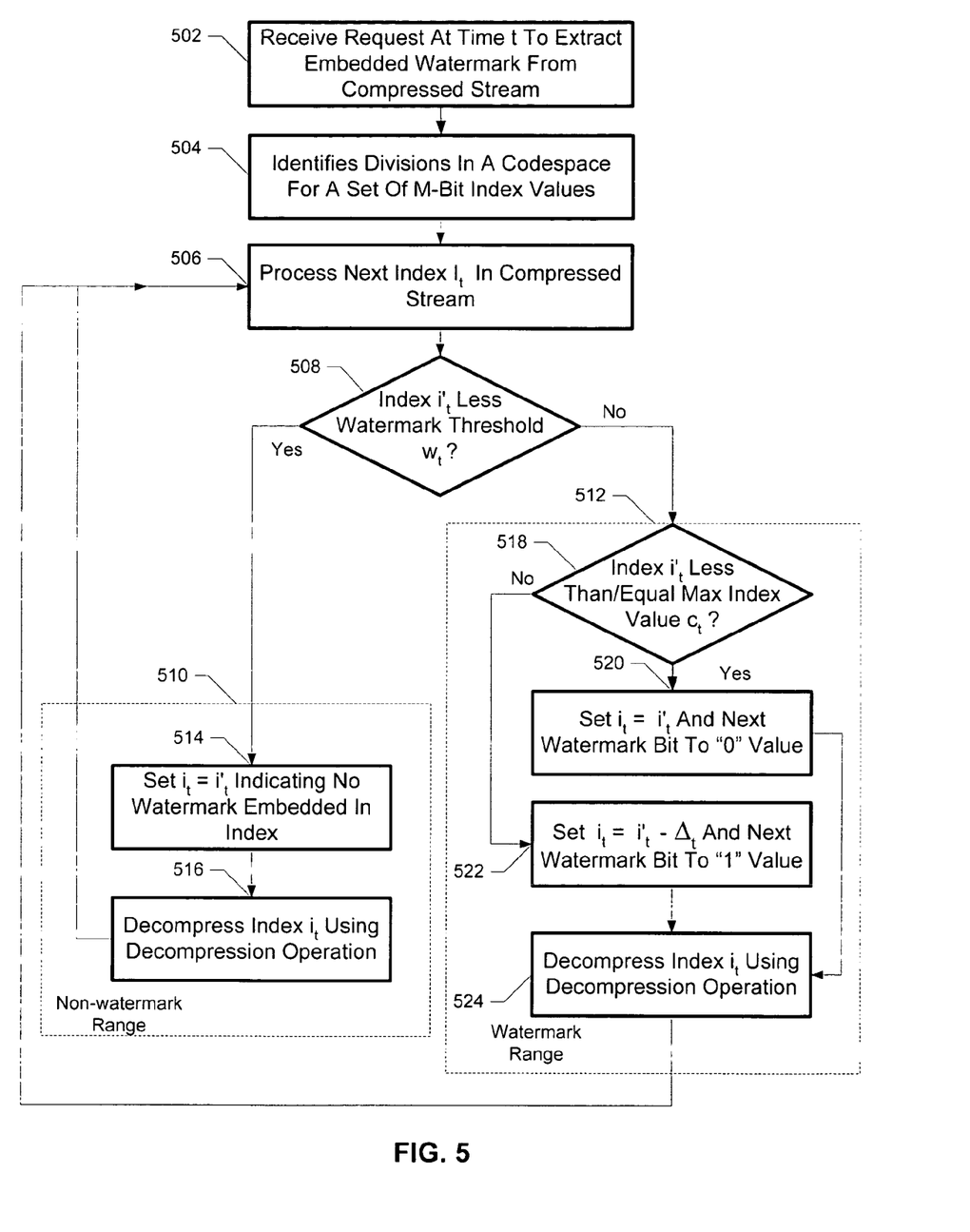
FIG. 5 is a flowchart diagram of the operations for extracting an embedded watermark in accordance with one implementation of the present invention.

FIG. 5 is a flowchart diagram of the operations for extracting an embedded watermark in accordance with one implementation of the present invention. At time t, the decoder typically has access to both the largest index value $c_t$ and the bit-width m of the codeword being used to transmit indices. These values are used to compute other useful values in the watermark extraction process including watermark delta value $\Delta_t$ and watermark threshold ($w_t$). Once a decoder extracts the watermark bits in accordance with the present invention, conventional decompression according to LZ compression or their variants decompresses the data stream.

Watermark extraction begins with a request at time t to extract an embedded watermark from the compressed data stream (502). In one implementation, a decoder is enhanced in accordance with implementations of the present invention to extract a watermark as well as perform conventional decompression according to LZ compression and variants. If the compressed stream was produced by a conventional compressor without the watermark enhancement, the enhanced decoder will be able to decompress the stream, and will "extract" an all-zero watermark. The enhanced decoder thereby remains compatible with existing conventional compressed streams.

Decoder initially identifies the divisions in a codespace for a non-watermark value range, a zero-bit watermark value range and a one-bit watermark value range within a set of m-bit index values (504). Identifying the divisions includes determining the largest index value $c_t$, the bit-width m of the codeword being used to transmit indices and calculating watermark delta value $\Delta_t$ and watermark threshold ($w_t$) as previously described. Unused codespace in the one-bit watermark value range is exploited to embed and now extract the watermark. The nature of the LZ family of compression allows the decoder to reconstruct the symbols and indices for decompression while the additional parameters described above (i.e., $c_t$, $w_t$, m and $\Delta_t$) are either provided or derived in this watermark extraction process.

When the index $i_t'$ is less than watermark threshold $w_t$ and yet greater than 0, decoder classifies the index as not having an embedded watermark bit (510). Conversely, decoder classifies the index as having an embedded watermark bit when $i_t'$ is greater than watermark threshold $w_t$ (512). In the former case of no watermark bit, the decoder sets $i_t$ to $i_t'$ for decompression of index $i_t$ (514) without transmitting a watermark bit value (516).

In the latter case of an embedded watermark bit, the decoder further determines if the $i_t'$ is less than or equal to the largest index value at time t $c_t$ (518). When $i_t'$ is not less than or equal to $c_t$, the decoder sets $i_t$ to $i_t' - \Delta_t$ and the next watermark bit value to a "1" value (522). This is because indices $i_t'$ greater than $c_t$ are in the one-bit watermark range. In the event $i_t'$ is less than or equal to $c_t$ then the decoder sets $i_t$ to $i_t'$ and the next watermark bit value to a "0" value (520). This is because indices $i_t'$ less than or equal to $c_t$ are in the zero-bit watermark range upon encoding. In both the former and latter case of decoding, the resulting compressed index value $i_t$ is then decompressed using a conventional decompression operation (524).

Figure 6:
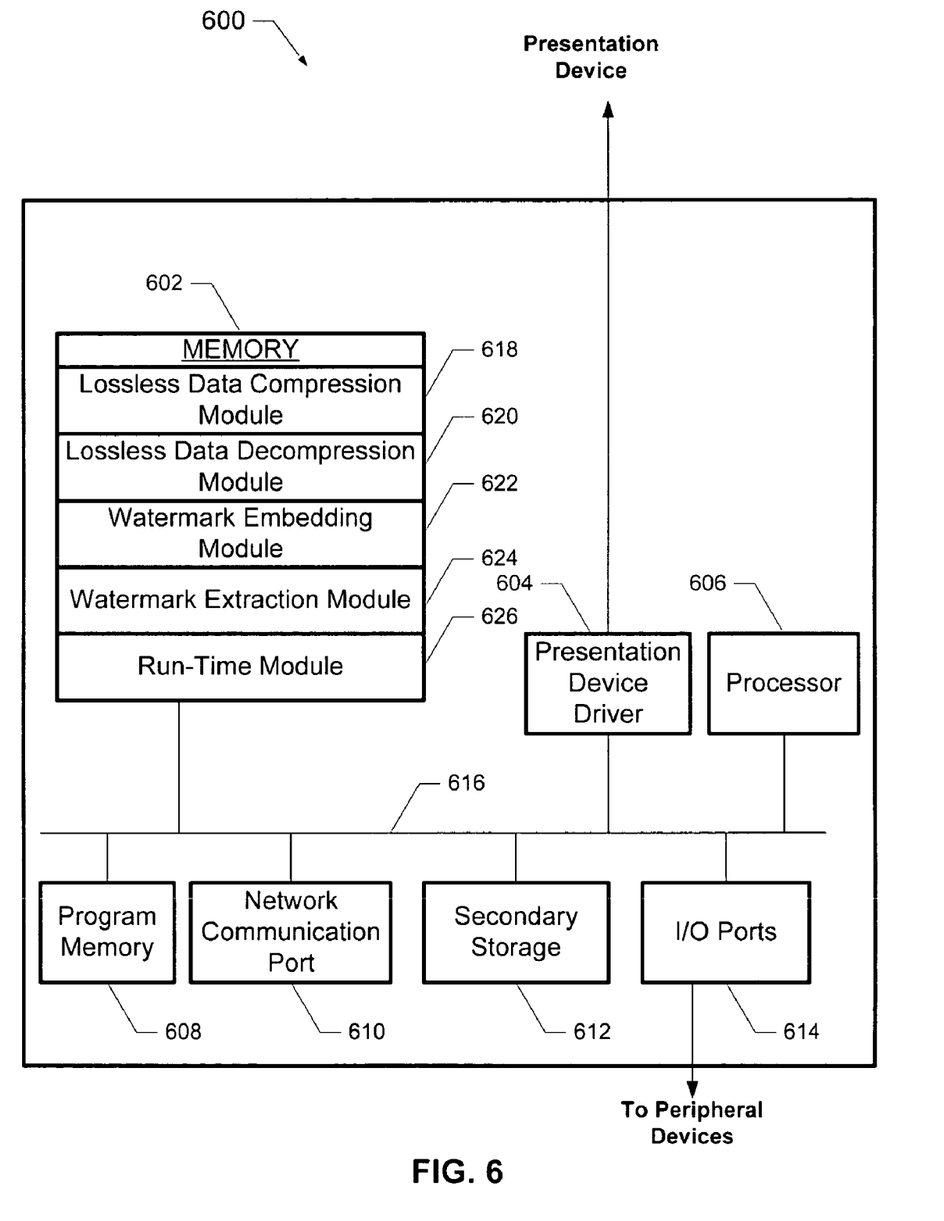
FIG. 6 is a block diagram of a system used in one implementation for performing the apparatus or methods of the present invention.

FIG. 6 is a block diagram of a system 600 used in one implementation for performing the apparatus or methods of the present invention. System 600 includes a memory 602 to hold executing programs (typically random access memory (RAM) or writable read-only memory (ROM) such as a flash ROM), a presentation device driver 604 capable of interfacing and driving a display or output device, a processor 606, a program memory 608 for holding drivers or other frequently used programs, a network communication port 610 for data communication, a secondary storage 612 with secondary storage controller, and input/output (I/O) ports 614 also with I/O controller operatively coupled together over a bus 616. The system 600 can be preprogrammed, in ROM, for example, using field-programmable gate array (FPGA) technology or it can be programmed (and reprogrammed) by loading a program from another source (for example, from a floppy disk, a CD-ROM, or another computer). Also, system 600 can be implemented using customized application specific integrated circuits (ASICs).

In one implementation, memory 602 includes a lossless data compression module 618, a lossless data decompression module 620, a watermark embedding module 622, a watermark extraction module 624 and a run-time module 626 that manages system resources used when processing one or more of the above components on system 600.

As previously described, lossless data compression module 618 can be implemented using any dictionary-based compression scheme including the LZ family of lossless compression or its variants. Likewise, lossless decompression module 620 can also be implemented using the same dictionary-based compression schemes along with the LZ family of lossless compression or the variants to decompress the previously compressed data stream.

Watermark embedding module 622 operates in accordance with implementations of the present invention to embed a bit-sequence corresponding to a watermark as previously described and watermark extraction module 624 reverses this process and extracts the embedded watermark. In an alternate implementation, lossless data compression/decompression and watermark embedding/extraction are implemented in a single module rather than multiple separate modules to facilitate ease of use and higher levels of integration.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

While specific embodiments have been described herein for purposes of illustration, various modifications may be made without departing from the spirit and scope of the invention. For example, in an alternative implementation of the present invention, a watermark embedding operation could be carried out directly on an existing GIF file having a compressed stream of data. GIF is one example of a compressed stream produced using a conventional encoder and dictionary-based compression scheme including the LZ78 variant of LZ compression. The watermark embedding process of the present invention would include a partial decompression of the compressed stream to reconstruct the dictionary. In accordance with the present invention further operations include building the decompression dictionary on these existing compressed streams, classifying codeword indices according to regions A and B as described above, and selectively re-mapping indices in region B to corresponding indices in region C according to the bit values in the watermark. Accordingly, the invention is not limited to the above-described implementations, but instead is defined by the appended claims in light of their full scope of equivalents.

What is claimed is:

1. A method of embedding a watermark bit-sequence in a data stream of symbols compressed using dictionary-based compression scheme with variable length indices, comprising:
   receiving a request to transmit an index value from a set of m-bit index values used to compress one or more symbols in the data stream;
   identifying divisions in the set of m-bit index values including a non-watermark value range, a zero-bit watermark value range and a one-bit watermark value range;
   determining a watermark bit value corresponding to the watermark bit sequence as either a zero-bit value or a one-bit value;
   transmitting the index value in the one-bit watermark value range when the watermark bit value is determined to be a one-bit value; and
   transmitting the index value in the zero-bit watermark value range when the watermark bit value is determined to be a zero-bit value.

2. The method of claim 1 further comprising:
   transmitting the index value without watermark embedding when the index belongs to the non-watermark value range.

3. The method of claim 1 wherein the symbols are compressed losslessly utilizing one or more variants of the Lempel-Ziv (LZ) family of lossless data compression schemes.

4. The method of claim 1 wherein an index in the non-watermark value range does not carry a watermark bit value and occupies a lower range of values from a set of m-bit index values.

5. The method of claim 4 wherein the lower range of values corresponds to a set of indices substantially below a watermark threshold ($w_t$).

6. The method of claim 4 wherein the watermark threshold ($w_t$) corresponds to a maximum index entry ($c_t$) less a maximum value using m-bits of data.

7. The method of claim 1 wherein the zero-bit watermark value range is substantially greater than the watermark threshold ($w_t$) and substantially less than the maximum index entry ($c_t$).

8. The method of claim 1 wherein the one-bit watermark value range is substantially greater than the maximum index entry ($c_t$) and substantially less than a maximum value using m-bits of data.

9. The method of claim 1 wherein transmitting the index in the one-bit watermark value range includes:
   identifying the requested index value in the zero-bit watermark value range; and
   adding a watermark delta value to the index value in the zero-bit watermark value range to identify a symmetric entry in the one-bit watermark value range.

10. The method of claim 8 wherein the watermark delta value corresponds to a maximum value using m-bits of data less at least a maximum index entry ($c_t$).

11. The method of claim 1 wherein transmitting the index in the zero-bit watermark value range includes:
   identifying the requested index value in the zero-bit watermark value range.

12. The method of claim 1 further comprising:
   receiving a preexisting compressed data stream not configured to support an embedded watermark bit-sequence;
   partially decompressing the preexisting compressed data stream of symbols; and
   reconstructing the data stream of symbols with indices that embed the watermark bit-sequence.

13. The method of claim 12 wherein the preexisting compressed data stream is compatible with the GIF compression format.

14. A method of extracting a watermark bit-sequence from a data stream of symbols compressed using a dictionary-based compression scheme with variable length indices, comprising:
   identifying the divisions for a non-watermark value range, a zero-bit watermark value range and a one-bit watermark value range within a set of m-bit index values;

receiving an input index value potentially having an embedded watermark value;

classifying the input index value as a member of one of the divisions within the set of m-bit index values;

setting a next bit of the watermark bit-sequence to a zero value when the input index value is in the zero-bit watermark value range; and setting a next bit of the watermark bit-sequence to a one value when the input index value is in the one-bit watermark value range.

15. The method of claim 14 wherein the watermark bit-sequence extracted can be used as a fragile watermark to identify if the compressed data stream of symbols have been altered.

16. The method of claim 14 further comprising:
receiving no watermark value when the index value is in the non-watermark value range.

17. The method of claim 14 wherein the symbols are decompressed losslessly utilizing one or more variants of the Lempel-Ziv (LZ) family of lossless data compression schemes.

18. The method of claim 14 wherein an index in the non-watermark value range does not carry a watermark bit value and occupies a lower range of values from a set of m-bit index values.

19. The method of claim 18 wherein the lower range of values corresponds to a set of indices substantially below a watermark threshold ($w_t$).

20. The method of claim 19 wherein the watermark threshold ($w_t$) corresponds to a maximum index entry ($c_t$) less a maximum value using m-bits of data.

21. The method of claim 14 wherein the zero-bit watermark value range is substantially greater than the watermark threshold ($w_t$) and substantially less than the maximum index entry ($c_t$).

22. The method of claim 14 wherein the one-bit watermark value range is substantially greater than the maximum index entry ($c_t$) and substantially less than a maximum value using m-bits of data.

23. The method of claim 14 wherein setting the next bit of the watermark bit-sequence to a one value further comprises:
subtracting a watermark delta value to the index value in the one-bit watermark value range to identify a symmetric entry in the zero-bit watermark value range; and
setting an index representing a compressed string to the index identified in the zero-bit watermark value range.

24. The method of claim 23 wherein the watermark delta value corresponds to a maximum value using m-bits of data less at least a maximum index entry ($c_t$).

25. The method of claim 14 wherein setting the next bit of the watermark bit-sequence to a zero value further comprises:
setting an index representing a symbol to the index identified in the zero-bit watermark value range.

26. A computer program product for embedding a watermark bit-sequence in a data stream of symbols compressed using dictionary-based compression scheme with variable length indices, tangibly stored on a computer-readable medium, comprising instructions operable to cause a programmable processor to:
receive a request to transmit an index value from a set of m-bit index values used to compress one or more symbols in the data stream;
identify divisions in the set of m-bit index values including a non-watermark value range, a zero-bit watermark value range and a one-bit watermark value range;

determine a watermark bit value corresponding to the watermark bit sequence as either a zero-bit value or a one-bit value;

transmit the index value in the one-bit watermark value range when the watermark bit value is determined to be a one-bit value; and transmit the index value in the zero-bit watermark value range when the watermark bit value is determined to be a zero-bit value.

27. The computer program product of claim 26 further comprising instructions when executed:
transmit the index value without watermark embedding when the index belongs to the non-watermark value range.

28. The computer program product of claim 26 wherein the symbols are compressed losslessly utilizing one or more variants of the Lempel-Ziv (LZ) family of lossless data compression schemes.

29. The computer program product of claim 26 wherein an index in the non-watermark value range does not carry a watermark bit value and occupies a lower range of values from a set of m-bit index values.

30. The computer program product of claim 29 wherein the lower range of values corresponds to a set of indices substantially below a watermark threshold ($w_t$).

31. The computer program product of claim 30 wherein the watermark threshold ($w_t$) corresponds to a maximum index entry ($c_t$) less a maximum value using m-bits of data.

32. The computer program product of claim 26 wherein the zero-bit watermark value range is substantially greater than the watermark threshold ($w_t$) and substantially less than the maximum index entry ($c_t$).

33. The computer program product of claim 26 wherein the one-bit watermark value range is substantially greater than the maximum index entry ($c_t$) and substantially less than a maximum value using m-bits of data.

34. The computer program product of claim 26 wherein instructions for transmitting the index in the one-bit watermark value range includes further comprise instructions when executed that:
identify the requested index value in the zero-bit watermark value range; and
add a watermark delta value to the index value in the zero-bit watermark value range to identify a symmetric entry in the one-bit watermark value range.

35. The computer program product of claim 34 wherein the watermark delta value corresponds to a maximum value using m-bits of data less at least a maximum index entry ($c_t$).

36. The computer program product of claim 26 wherein instructions for transmitting the index in the zero-bit watermark value range further comprises instructions when executed that:
identify the requested index value in the zero-bit watermark value range.

37. The computer program product of claim 26 further comprising instructions to:
receive a preexisting compressed data stream not configured to support an embedded watermark bit-sequence;
partially decompress the preexisting compressed data stream of symbols; and
reconstruct the data stream of symbols with indices that embed the watermark bit-sequence.

38. The computer program product of claim 37 wherein the preexisting compressed data stream is compatible with the GIF compression format.

39. A computer program product for extracting a watermark bit-sequence from a data stream of symbols compressed using a dictionary-based compression scheme with variable length indices, tangibly stored on a computer-readable medium, comprising instructions operable to cause a programmable processor to:

identify the divisions for a non-watermark value range, a zero-bit watermark value range and a one-bit watermark value range within a set of m-bit index values;

receive an input index value potentially having an embedded watermark value;

classify the input index value as a member of one of the divisions within the set of m-bit index values;

set a next bit of the watermark bit-sequence to a zero value when the input index value is in the zero-bit watermark value range; and set a next bit of the watermark bit-sequence to a one value when the input index value is in the one-bit watermark value range.

40. The computer program product of claim 39 wherein the watermark bit-sequence extracted can be used as a fragile watermark to identify if the compressed data stream of symbols have been altered.

41. The computer program product of claim 39 further comprising:

receiving no watermark value when the index value is in the non-watermark value range.

42. The computer program product of claim 39 wherein the symbols are decompressed losslessly utilizing one or more variants of the Lempel-Ziv (LZ) family of lossless data compression schemes.

43. The computer program product of claim 39 wherein an index in the non-watermark value range does not carry a watermark bit value and occupies a lower range of values from a set of m-bit index values.

44. The computer program product of claim 43 wherein the lower range of values corresponds to a set of indices substantially below a watermark threshold ($w_t$).

45. The computer program product of claim 44 wherein the watermark threshold ($w_t$) corresponds to a maximum index entry ($c_t$) less a maximum value using m-bits of data.

46. The computer program product of claim 39 wherein the zero-bit watermark value range is substantially greater than the watermark threshold ($w_t$) and substantially less than the maximum index entry ($c_t$).

47. The computer program product of claim 39 wherein the one-bit watermark value range is substantially greater than the maximum index entry ($c_t$) and substantially less than a maximum value using m-bits of data.

48. The computer program product of claim 39 wherein instructions that set the next bit of the watermark bit-sequence to a one value further comprises instructions that:

subtract a watermark delta value to the index value in the one-bit watermark value range to identify a symmetric entry in the zero-bit watermark value range; and set an index representing a symbol to the index identified in the zero-bit watermark value range.

49. The computer program product of claim 48 wherein the watermark delta value corresponds to a maximum value using m-bits of data less at least a maximum index entry ($c_t$).

50. The computer program product of claim 39 wherein setting the next bit of the watermark bit-sequence to a zero value further comprises instructions that:

set an index representing a symbol to the index identified in the zero-bit watermark value range.

51. An apparatus for embedding a watermark bit-sequence in a data stream of symbols compressed using dictionary-based compression scheme with variable length indices, comprising:

means for receiving a request to transmit an index value from a set of m-bit index values used to compress one or more symbols in the data stream;

means for identifying divisions in the set of m-bit index values including a non-watermark value range, a zero-bit watermark value range and a one-bit watermark value range;

means for determining a watermark bit value corresponding to the watermark bit sequence as either a zero-bit value or a one-bit value;

means for transmitting the index value in the one-bit watermark value range when the watermark bit value is determined to be a one-bit value; and means for transmitting the index value in the zero-bit watermark value range when the watermark bit value is determined to be a zero-bit value.

52. An apparatus for extracting a watermark bit-sequence from a data stream of symbols compressed using a dictionary-based compression scheme with variable length indices, comprising:

means for identifying the divisions for a non-watermark value range, a zero-bit watermark value range and a one-bit watermark value range within a set of m-bit index values;

means for receiving an input index value potentially having an embedded watermark value;

means for classifying the input index value as a member of one of the divisions within the set of m-bit index values;

means for setting a next bit of the watermark bit-sequence to a zero value when the input index value is in the zero-bit watermark value range; and means for setting a next bit of the watermark bit-sequence to a one value when the input index value is in the one-bit watermark value range.

* * * * *